United States Patent
Chen

(10) Patent No.: US 8,827,529 B2
(45) Date of Patent: Sep. 9, 2014

(54) BACK ILLUMINATED INPUT DEVICE WITH SELECTIVELY VISIBLE LUMINOUS PATTERNS

(75) Inventor: Chung-Yuan Chen, Taipei (TW)

(73) Assignee: Primax Electronics Ltd., Taipei (TW)

(*) Notice: Subject to any disclaimer, the term of this patent is extended or adjusted under 35 U.S.C. 154(b) by 305 days.

(21) Appl. No.: 13/241,828

(22) Filed: Sep. 23, 2011

(65) Prior Publication Data

US 2012/0307521 A1  Dec. 6, 2012

(30) Foreign Application Priority Data

Jun. 3, 2011 (TW) .............................. 100119532 A

(51) Int. Cl.
*G01D 11/28* (2006.01)

(52) U.S. Cl.
USPC ......... 362/619; 362/23.16; 362/624; 362/625

(58) Field of Classification Search
USPC ............ 345/173, 174, 176; 362/23.16, 23.17, 362/617, 619, 620, 623, 624, 625, 626
See application file for complete search history.

(56) References Cited

U.S. PATENT DOCUMENTS

| 4,017,848 | A | * | 4/1977 | Tannas, Jr. ...................... 341/34 |
| 4,161,766 | A | * | 7/1979 | Castleberry et al. .......... 361/280 |
| 4,700,025 | A | * | 10/1987 | Hatayama et al. ............. 200/5 A |
| 5,239,152 | A | * | 8/1993 | Caldwell et al. .............. 200/600 |
| 6,215,476 | B1 | * | 4/2001 | Depew et al. .................. 345/173 |
| 6,822,640 | B2 | * | 11/2004 | Derocher ....................... 345/173 |
| 7,268,770 | B1 | * | 9/2007 | Takahata et al. .............. 345/173 |
| 7,572,023 | B2 | * | 8/2009 | Chen .............................. 362/26 |
| 2008/0266272 | A1 | * | 10/2008 | Narayan et al. ............... 345/174 |
| 2009/0109068 | A1 | * | 4/2009 | Yeh et al. ......................... 341/34 |
| 2009/0309845 | A1 | * | 12/2009 | Chen et al. .................... 345/173 |
| 2010/0090967 | A1 | * | 4/2010 | Jang ............................... 345/173 |
| 2012/0268395 | A1 | * | 10/2012 | Wang et al. ................... 345/173 |

* cited by examiner

*Primary Examiner* — Ismael Negron
(74) *Attorney, Agent, or Firm* — Kirton McConkie; Evan R. Witt

(57) ABSTRACT

The input device with luminous patterns includes an input interface and a backlight module. The backlight module includes a light source and a light guide plate. The input interface has a predetermined light shading rate and at least one pattern formed on the light guide plate. When the light source is turned off, the light passing through the light guide plate is too weak to show the pattern. When the light source is turned on, the luminous pattern is shown. One base plate of the input interface is made from a mixture of transparent plastic particles and light shading particles, and the at least one pattern is formed of the micro light guide structures.

12 Claims, 3 Drawing Sheets

BACK ILLUMINATED INPUT DEVICE WITH SELECTIVELY VISIBLE LUMINOUS PATTERNS

FIELD OF THE INVENTION

The present invention generally relates to an input device, and more particularly to an input device with luminous patterns.

BACKGROUND OF THE INVENTION

Applications of the touch input device is quite extensive. Currently, some of the touch input device which is commercially available has two kinds of different input modes simultaneously. Herein, the touch input device has a backlight module, and a first input mode is provided when the backlight module is turned on and thus the touch input device shows a predetermined pattern, while a second input mode is provided when the backlight module is turned off and thus the predetermined pattern is not shown. In another word, users may recognize which input mode it is switched to currently by whether the pattern is shown or not, and then input signals according to the current input mode. For example, when the backlight is turned off, an appearance of the touch input device is presented as a whole black state and the input mode is preset a mode for controlling a mouse cursor. At this time, users can implement motions of moving the mouse cursor and clicking according to the appearance of the touch input device is presented as the whole black state. On the contrary, when the backlight is turned on, a luminous keyboard is presented on the touch input device and the input mode is preset a mode for controlling a keyboard. At this time, users can input letters and symbols by the touch input device according to the appearance is presented as the luminous keyboard pattern. Therefore, one of the design points of such a backlight touch input device is how to ensure that the pattern is not shown when the backlight is turned off, but the luminous pattern is shown only when the backlight is turned on, so as to avoid confusing users.

FIG. 1 illustrates a structural side view of a conventional backlight input device. Referring to FIG. 1, the conventional backlight input device 1 comprises an input interface 11, a backlight module 12 and a Mylar plate 19, wherein a bottom-up sequence thereof is the input interface 11, the backlight module 12 and the Mylar plate 19. Herein, the backlight module 12 comprises a light source 13 and a light guide plate 14, while a lower surface of the Mylar plate 19 is disposed with a plurality of patterns 17. The patterns 17 are printed by using a light transmissive black printing ink with a light shading rate about 98%, and the regions outside the patterns 17 are printed by using an opaque black printing ink to form a light shading layer 18. Thus, the light can pass through the surface of the Mylar plate 19 from where is printed with the patterns 17 only, but is unable to pass through from the regions outside the patterns 17. When the backlight module 12 of the backlight input device 1 is turned off, there is still faint light entering into the backlight input device 1 from the environment. However, the light quantity of the 2% faint light coming from the environment and passing through the regions printed with the patterns 17 is too weak to be distinguished by human eyes due to the light shading rate of the patterns 17 is 98%, and thus the patterns 17 would not be shown on the Mylar plate 19, i.e. users would not see the patterns 17. In contrast, when the backlight module 12 of the backlight input device 1 is turned on, there is a significant amount of light entering into the backlight input device 1. At this time, a difference of the light quantities between the light passing through the regions printed with the patterns 17 and the light coming from the environment is enough to be distinguished by human eyes although there is only 2% light passing through the Mylar plate 19, and thus users can recognize the inputting locations indicated by the luminous patterns 17 on the backlight input device 1.

FIG. 2 illustrates a structural side view of another conventional backlight input device 2. Referring to FIG. 2, the other conventional backlight input device 2 comprises an input interface 21, a backlight module 22 and a surface layer 29, wherein a bottom-up sequence thereof is the input interface 21, the backlight module 22 and the surface layer 29. An upper surface of the surface layer 29 is printed with a shading printing ink, so as to form a light shading layer 28 having a predetermined light shading rate. The backlight module 22 comprises a light source 23 and a light guide plate 24. A lower surface 26 of the light guide plate 24 has at least a pattern 27 formed from micro structures of light guide arranged densely. The destruction of total reflection may happen due to incident angles of the light are capable of being varied by the micro structures of light guide in the light guide plate 24, and thus the light may be refracted to pass through the light guide plate 24. Therefore, when the light quantity in the light guide is sufficient, the light quantity reveals from the top side of the micro structures of light guide is enough to be distinguished by human eyes, and thus the pattern 27 is visible. When the backlight module 22 of the backlight input device 2 is turned off, the light quantity entering into the backlight input device 2 is not sufficient, and thus the pattern 27 would not be shown due to the light quantity passing through the light shading layer 28 is not enough, i.e. users would not see the pattern 27. In contrast, when the backlight module 22 is turned on, the light passing through the light shading layer 28 via the micro structures of light guide is enough to show the luminous pattern 27.

However, both of the two conventional backlight input devices have restrictions in applications. For ensuring that the patterns 17 are not shown when the backlight module 12 is turned off, the conventional backlight input device 1 must use the light transmissive black printing ink with the light shading rate about 98% to print the patterns 17, and thus utilization efficiency of the backlight is only 2%. Therefore, the conventional backlight input device 1 must be equipped with the light source 13 with a high brightness, so as to provide the sufficient light quantity to pass through the light shading layer 28 to show the pattern 27 when the backlight module 22 is turned on, and thus the use cost is increased. In addition, the light shading manners of both of the conventional backlight input device 1 and the conventional backlight input device 2 are disposing a Mylar plate 19 or a surface layer 29 over the light guide plate 24 which is coated with light shading materials on the surface thereof by a screen printing process. However, the screen printing process for coating the light shading materials is complicated, and thus the fabricating cost is further increased as well. Furthermore, the light shading materials coated on the surface of the Mylar plate 19 or the surface layer 29 are likely to fall off due to a long term use or wear and tear during transportation, and thus the life time of the backlight input device may be reduced. Accordingly, it is desired to provide a novel backlight input device to resolve the disadvantages of the conventional backlight input devices.

SUMMARY OF THE INVENTION

The present invention is directed to an input device with luminous patterns, which has higher backlight utilization efficiency.

The present invention is also directed to an input device with luminous patterns, which is fabricated by a simpler process and thinner and lighter.

The present invention is further directed to an input device with luminous patterns, wherein the light shading materials thereof is not likely to fall off due to a long term use or wear and tear during transportation.

The present invention is also directed to an input device with luminous patterns, wherein the light shading effect thereof is more uniform.

In a preferred embodiment, the present invention provides an input device with luminous patterns comprising:
an input interface, having a predetermined light shading rate; and
a backlight module, disposed under the input interface, wherein the backlight module comprises:
a light source; and
a light guide plate, having at least a pattern, and the at least a pattern disposed on an upper surface or a lower surface of the light guide plate, wherein when the light source is turned off, the at least a pattern is unable to be shown due to a brightness of the light guide plate is lower than the predetermined light shading rate.

In a preferred embodiment, the input interface comprises at least a substrate, and the at least a substrate is doped with a plurality of light shading particles, and thus the input interface has the predetermined light shading rate, wherein the predetermined light shading rate is ranged between 75% and 80%.

In a preferred embodiment, the at least a substrate is a glass plate or a plastic plate.

In a preferred embodiment, the input interface is a light transmissive resistive touch sensor.

In a preferred embodiment, the input interface further comprises a protective layer disposed over the at least a substrate, and the protective layer is doped with a plurality of light shading particles, and thus the input interface has the predetermined light shading rate, and the predetermined light shading rate is ranged between 75% and 80%.

In a preferred embodiment, the protective layer is a glass plate or a plastic plate.

In a preferred embodiment, the input interface is a light transmissive surface capacitive touch sensor, a light transmissive inner capacitive touch sensor or a light transmissive projected capacitive touch sensor.

In a preferred embodiment, the at least a pattern is formed from a plurality of micro structures of light guide arranged densely, and the plurality of micro structures of light guide are a plurality of mesh points or a plurality of micro structures arranged densely.

In a preferred embodiment, the input device with luminous patterns of the present invention further comprises a black base plate for absorbing a light beam, wherein the black base plate provides a black background when the backlight module is turned off, and thus the at least a pattern is unable to be shown, and the at least a pattern of the light guide plate is a button pattern, a keyboard pattern or a pattern of an interactive component.

In a preferred embodiment, the present invention further provides an input device with luminous patterns comprising:
an input interface;
a backlight module, comprising:
a light source; and
a light guide plate, having at least a pattern, and the at least a pattern disposed on an upper surface or a lower surface of the light guide plate; and
a protective layer, disposed over the backlight module, and the protective layer having a predetermined light shading rate, wherein when the light source is turned off, the at least a pattern is unable to be shown due to a brightness of the light guide plate is lower than the predetermined light shading rate.

In a preferred embodiment, the protective layer is doped with a plurality of light shading particles, and thus the input interface has the predetermined light shading rate, and the predetermined light shading rate is ranged between 75% and 80%.

In a preferred embodiment, the protective layer is a glass plate or a plastic plate.

In a preferred embodiment, the input interface is disposed under the backlight module, and the input interface is an opaque printed circuit board capacitive touch sensor.

In a preferred embodiment, the input device with luminous patterns of the present invention further comprises a black printing ink layer disposed on an upper surface of the input interface for absorbing a light beam, wherein the black printing ink layer is used as a black background when the backlight module is turned off, and thus the at least a pattern is unable to be shown, and the at least a pattern is a button pattern, a keyboard pattern or a pattern of an interactive component.

DETAILED DESCRIPTION OF THE PREFERRED EMBODIMENT

Figure 1:
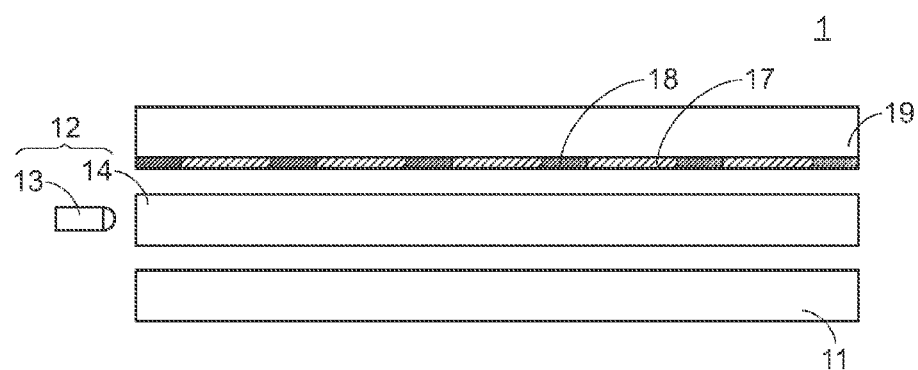
FIG. 1 illustrates a structural schematic view of an appearance of a conventional backlight input device.
Figure 2:
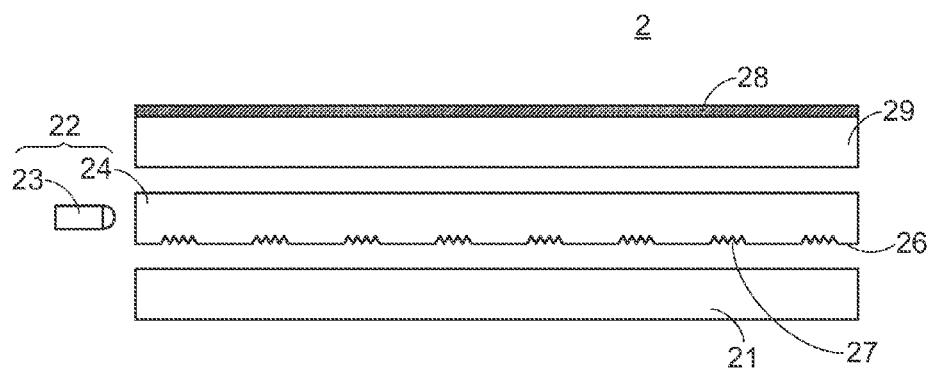
FIG. 2 illustrates a structural schematic view of an appearance of another conventional backlight input device.
Figure 3:
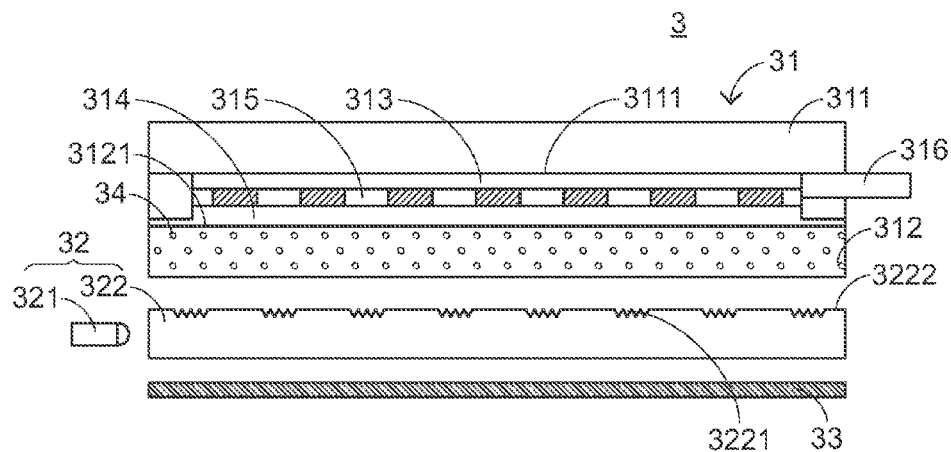
FIG. 3 illustrates a structural side view of an input device with luminous patterns according to a first preferred embodiment of the present invention.

In view of the defects of the conventional arts, the present invention provides an input device with luminous patterns. FIG. 3 illustrates a structural side view of an input device with luminous patterns according to a first preferred embodiment of the present invention. Referring to FIG. 3, the input device 3 with luminous patterns comprises an input interface 31, a backlight module 32 and a black base plate 33, wherein a sequence from top to bottom thereof is the input interface 31, the backlight module 32 and the black base plate 33. The input interface 31 comprises a first substrate 311, a second substrate 312, a first transparent conducting film 313, a second transparent conducting film 314, a micro spot space layer 315 and a connector 316. The first substrate 311 is located over the second substrate 312, the first transparent conducting film 313 is disposed on a lower surface 3111 of the first substrate 311, and the second transparent conducting film 314 is disposed on an upper surface 3121 of the second substrate 312. In addition, the micro spot space layer 315 is located between the first substrate 311 and the second substrate 312 for separating the first transparent conducting film 313 on the first substrate 311 and the second transparent conducting film 314 on the second substrate 312, so as to avoid the first substrate 311 contacting with the second substrate 312. Furthermore, the connector 316 connects with the first transparent conducting film 313 for outputting a signal. In the present preferred embodiment, the input interface 31 is a light transmissive resistive touch sensor, the first substrate 311 is a film, the second substrate 312 is a plastic plate, and both of the first transparent conducting film 313 and the second transparent conducting film 314 are made from indium tin oxide (ITO).

In the input interface 31, the second substrate 312 is formed from uniformly mixing transparent plastic particles with a plurality of light shading particles 34 in a specific proportion first and then processed with an injection molding process, so as to let the second substrate 312 have a predetermined light shading rate and a uniform light shading result. In the present preferred embodiment, the predetermined light shading rate of the second substrate 312 is ranged between 75% and 80%.

In the FIG. 3, the backlight module 32 comprises a light source 321 and a light guide plate 322, wherein the light source 321 is capable of generating light beams and located at a side of the light guide plate 322, while the light guide plate 322 is capable of guiding the transmission of the light beams. In addition, the light guide plate 322 has at least a pattern 3221 disposed on an upper surface 3222 of the light guide plate 322. Each of the patterns 3221 as illustrated in FIG. 3 is formed from a plurality of micro structures of light guide arranged densely, and each of the plurality of micro structures of light guide may be a plurality of micro structures (such as micro lenses, v-cuts, etc.) arranged densely or a plurality of mesh points arranged densely. Herein, the micro structures of light guide for forming the patterns 3221 are used for varying incident angles of a partial light inside the light guide plate 322, and thus the partial light may be refracted to pass through the light guide plate 322 due to the total reflection paths of the partial light are changed. Therefore, the light reveals from the top side of the micro structures of light guide, so as to present the luminous patterns 3221. In the present preferred embodiment, the light source 321 is a light emitting diode (LED), and each of the patterns 3221 is a function button, a standard keyboard pattern, or a pattern of an interactive component of an operating system (OS) of the input device. For example, the function button thereof is a pattern of a power button, while the pattern of the interactive component of the OS of the input device is a pattern of an application program displayed on a desktop of a computer.

Figure 4:
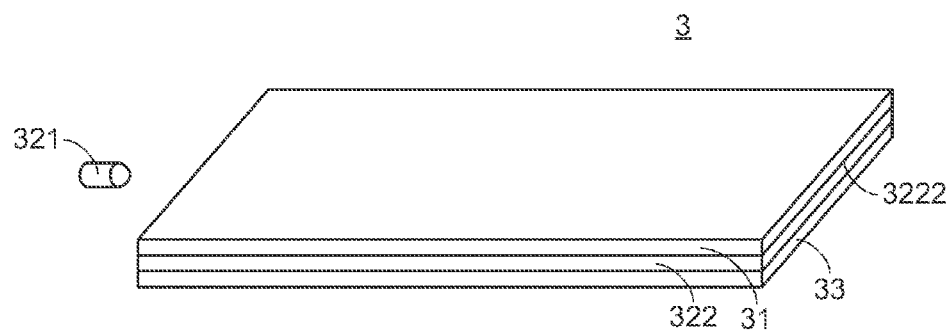
FIG. 4 illustrates a structural schematic view of the backlight module of the input device with luminous patterns being turned off according to the first preferred embodiment of the present invention.
Figure 5:
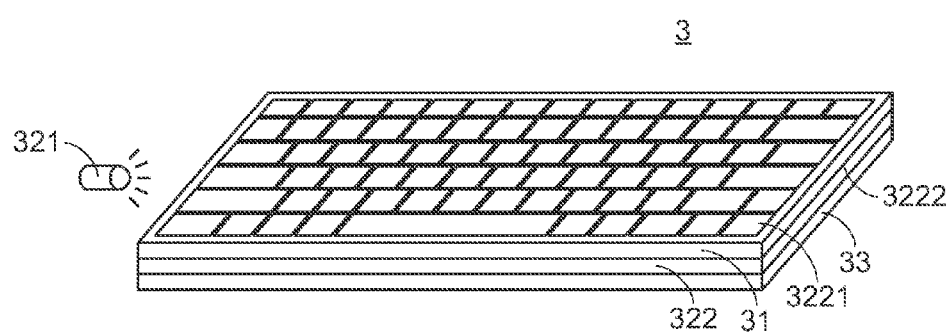
FIG. 5 illustrates a structural schematic view of the backlight module of the input device with luminous patterns being turned on according to the first preferred embodiment of the present invention.

Referring to FIG. 4 and FIG. 5 together herein after, FIG. 4 illustrates a structural schematic view of the backlight module of the input device with luminous patterns being turned off according to the first preferred embodiment of the present invention, and FIG. 5 illustrates a structural schematic view of the backlight module of the input device with luminous patterns being turned on according to the first preferred embodiment of the present invention. As illustrated in FIG. 4, when the backlight module 32 of the input device 3 with luminous patterns is turned off, the light source 321 is inactivated and not to generate any light beam, but only the faint light coming from the ambient environment is able to enter into the light guide plate 322 via the input interface 31. In an instance of the predetermined light shading rate of the input interface 31 is ranged between 75% and 80%, there is 75% to 80% of the faint light entered into the input interface 31 being absorbed by the plurality of the light shading particles 34, and the rest of the faint light about 20% to 25% is incident toward the light guide plate 322 when the rest of the faint light about 20% to 25% reaches the micro structures of light guide on the upper surface 3222 of the light guide plate 322. Since the light transmitted in different directions is incident to the micro structures of light guide with different incident angles, there is about a half of the light being refracted and then transmitted toward a bottom side of the light guide plate 322, and thus there is only about 10% of the faint light being reflected and then transmitted toward the input interface 31. The plurality of light shading particles 34 of the input interface 31 are capable of further absorbing some more light during the light being reflected, and thus there is only about 2% of the faint light revealing from the top of the input interface 31. Hence, the patterns 3221 would not be presented from the top of the input interface 31, i.e. users would not see the patterns 3221. In addition, the black base plate 33 located under the backlight module 32 is used as a black background when the backlight module 32 is turned off due to the black base plate 33 is capable of absorbing light beams, and thus the patterns 3221 is unable to be shown.

As illustrated in FIG. 5, when the backlight module 32 is turned on and thus the light source 321 is turned on, a significant amount of light provided by the light source 321 enters into the light guide plate 322 from a side surface thereof. Herein, when the light beams are transmitted to the patterns 3221 formed from the micro structures of light guide, the light beams are transmitted toward the upper surface 3222 of the light guide plate 322 due to the total reflection path is destroyed by the micro structures of light guide. When the light beams enters into the input interface 31, there is about 75% to 80% of the light beams being absorbed by the light shading particles 34 in the input interface 31, and thus there is about 20% to 25% of the light beams passing through the light guide plate 322, so as to present the luminous patterns 3221. Therefore, users can see the luminous patterns 3221 as illustrated in FIG. 5.

It should be noted that for achieving the requirement of not to show the patterns 17 when the backlight is turned off, the conventional backlight input device 1 must choose the light transmissive black printing ink with the light shading rate about 98% to print the patterns 17, and thus most of the faint light coming from the environment and entered into the Mylar plate 19 is absorbed by the black printing ink of the Mylar plate 19. Hence, only about 2% of the faint light remains to reveal from the top of the Mylar plate 19, and thus the patterns 17 are too dark to be distinguished by human eyes. However, it is result a disadvantage of that the utilization efficiency of the backlight is only about 2% when the light source is turned on due to the light transmissive rate of the light transmissive black printing ink used for printing the patterns 17 is only 2%. Accordingly, the conventional backlight input device 1 must be equipped with the light source with higher brightness, and thus the electric power consumption and the operation cost are increased.

In the present preferred embodiment, the second substrate 312 of the input interface 31 is formed by first uniformly mixing the transparent plastic particles with the plurality of light shading particles 34 and then processing them with the injection molding process, and the patterns 3221 are formed by densely arranging the micro structures of light guide on the upper surface 3222 of the light guide plate 322. Therefore, the light quantity of the faint light is absorbed by the plurality of light shading particles 34 in the input interface 31 after the faint light coming from the environment enters into and is reflected out of the input interface 31 if the backlight module 32 is turned off. In addition, only about a half of the light is capable of revealing from the top of the input interface 31 due to the light has different light incident angles. Therefore, after the faint light from the environment enters into the input device 3 with luminous patterns, the light quantity thereof is reduced continuously since the light is absorbed and reflected again and again during the light is transmitted. Hence, it is able to achieve the requirement of that not to show the patterns 3221 when the backlight module 32 is turned off by using the input interface 31 with the light shading rate about 80%, and the utilization efficiency of the backlight module 32 can reach to about 20% when the backlight module 32 is turned on. Accordingly, it is able to achieve less power consuming, more power saving and more cost reduction by using the light source with lower brightness and lower manufacturing cost.

Moreover, according to the conventional backlight input device 2, the light shading printing ink is printed on the surface of another surface layer by using the screen printing process, wherein the screen printing process needs to process a plurality of steps of screen plate fabrication comprising original screen plate fabrication, original screen plate cleanup, emulsion coating, plate burning, plate washout, imaging and so on first, to put the imaged screen plate on the surface layer for scraping and printing thereafter, and then to process an air drying process. Hence, the shading printing inks are not likely to be printed uniformly due to problems such as residue of shading printing inks, flatness of the scraper, flatness of a platform, solidness of printing ink molecules and so on, so as to generate a disadvantage of uneven light shading result. Herein, the screen printing process is printing the light shading materials on the surface of an object and thus the light shading materials are likely to fall off due to a long term use or wear and tear during transportation. However, in the input device 3 with luminous patterns of the present invention, the input interface 31 is formed by first uniformly mixing the transparent plastic particles with the plurality of light shading particles 34 and then processing them with the injection molding process, so that it is able to reach the advantages of significantly simplifying the process of combining the input interface 31 with the light shading materials, reducing the unevenness of the distribution of the light shading materials, and avoiding the light shading materials fallen off due to a long term use or wear and tear during transportation.

In the present preferred embodiment, the input interface 31 is a light transmissive resistive touch sensor, and the first substrate 311 is a film, while the second substrate 312 is a glass plate. In the other preferred embodiments, the first substrate and the second substrate may further be practiced by various combinations, such as the first substrate is a film and the second substrate is a glass plate, the first substrate is a bi-layers film and the second substrate is a plastic plate or a glass plate, the first substrate is a plastic plate or a glass plate and the second substrate is plastic plate or a glass plate and so on. Herein, only the plastic plate and the glass plate may be formed by mixing the transparent plastic particles or the transparent glass particles with the plurality of light shading particles in a specific proportion uniformly first and then processing them with the injection molding process, so as to form the first substrate of the second substrate.

Figure 6:
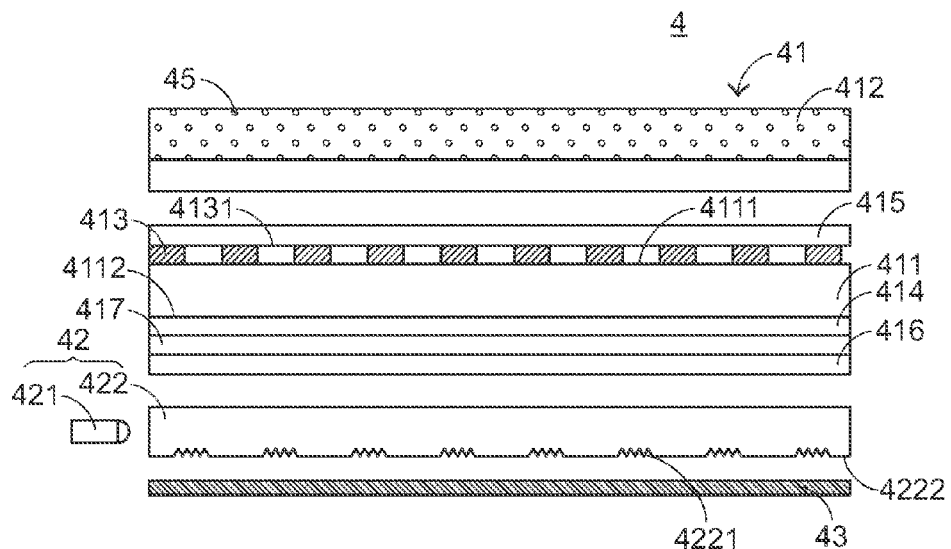
FIG. 6 illustrates a structural side view of a backlight module of an input device with luminous patterns according to a second preferred embodiment of the present invention.

In addition, the present invention further provides a second preferred embodiment. FIG. 6 illustrates a structural side view of a backlight module of an input device with luminous patterns according to a second preferred embodiment of the present invention. Referring to FIG. 6, the input device 4 with luminous patterns comprises an input interface 41, a backlight module 42 and a black base plate 43, and a sequence from top to bottom thereof is the input interface 41, the backlight module 42 and the black base plate 43. The input interface 41 comprises a substrate 411, a protective layer 412, a first transparent conducting film 413, a second transparent conducting film 414, a first insulating layer 415, a second insulating layer 416 and a metal conducting wire 417. The first transparent conducting film 413 is disposed on an upper surface 4111 of the substrate 411, the first insulating layer 415 is disposed on an upper surface 4131 of the first transparent conducting film 413 and capable of protecting the first transparent conducting film 413, and the protective layer 412 is disposed above the first insulating layer 415. The second transparent conducting film 414 is disposed on a lower surface 4112 of the substrate 411, the metal conducting wire 417 connects to the second transparent conducting film 414 and capable of outputting a signal, and the second insulating layer 416 is disposed under the metal conducing wire 417 and capable of protecting the second transparent conducting film 414. In the present preferred embodiment, the input interface 41 is a light transmissive projected capacitive touch sensor, each of the substrate 411 and the protective layer 412 is a glass plate, both of the first transparent conducting film 413 and the second transparent conducting film 414 are made from ITO, and both of the first insulating layer 415 and the second insulating layer 416 are made from silicon dioxide.

The protective layer 412 is disposed over the input interface 41, and the protective layer 412 is formed by uniformly mixing transparent glass particles with a plurality of light shading particles 45 in a specific proportion first and then processed with an injection molding process, so as to let the protective layer 412 have a predetermined light shading rate and a uniform light shading result. In the present preferred embodiment, the predetermined light shading rate of the protective layer 412 is ranged between 75% and 80%.

In the FIG. 6, the backlight module 42 comprises a light source 421 and a light guide plate 422, wherein the light source 421 is capable of generating light beams and located at a side of the light guide plate 422, while the light guide plate 422 is capable of guiding the transmission of the light beams. In addition, the light guide plate 422 has at least a pattern 4221 disposed on a lower surface 4222 of the light guide plate 422, and the black base plate 43 located under the backlight module 42 is capable of providing a better light shading result when the backlight module 42 is turned off.

The present preferred embodiment is substantially similar to the first preferred embodiment, except that a top side of the substrate 411 of the input interface 41 of the present preferred embodiment is further disposed with an additional protective layer 412, and the patterns 4221 of the present preferred embodiment is disposed on the lower surface 4222 of the light guide plate 422. Herein, the protective layer 412 is formed by mixing transparent glass particles with a plurality of light shading particles 45 uniformly in a specific proportion first and then processed with an injection molding process, and thus the protective layer 412 has advantages of light shading and protection providing. Hence, the effects resulted from the present preferred embodiment and the first preferred embodiment are substantially the same, except that the light shading effects of the two embodiments are slightly different due to the sequences of the faint light in the ambient environment passing through the micro structures of light guide and the light shading particles are different after the faint light is incident into the input device with luminous patterns. Besides, the other portions of the present preferred embodiment are substantially the same as that of the first preferred embodiment, and thus the detail descriptions thereof are omitted herein.

In the present preferred embodiment, the input interface 41 is a light transmissive capacitive touch sensor, and each of the substrate 411 and the protective layer 412 is a glass plate. In the other preferred embodiments, the substrate can be a plastic plate and the protective layer can be a plastic plate, the substrate can be a plastic plate and the protective layer can be a glass plate, or the substrate can be a glass plate and the protective layer can be a plastic plate. In addition, the input interface can be a light transmissive resistive touch sensor, a light transmissive surface capacitive touch sensor or a light transmissive inner capacitive touch sensor.

It should be noted that the protective layer 412 is formed by uniformly mixing transparent glass particles with a plurality of light shading particles 45 in a specific proportion first and then processed with an injection molding process, and thus the protective layer 412 has advantages of light shading and protection providing. However, in the other preferred embodiments, the substrate may be formed by uniformly mixing transparent glass particles with a plurality of light shading particles in a specific proportion first and then processed with an injection molding process as well, so as to let the substrate also have advantages of light shading and protection providing.

Figure 7:
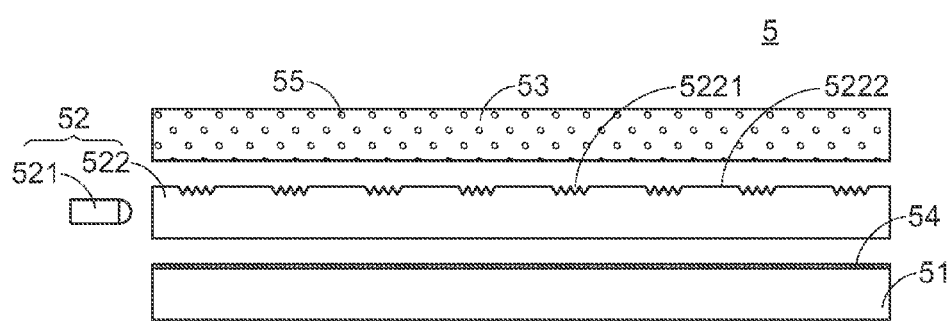
FIG. 7 illustrates a structural side view of a backlight module of an input device with luminous patterns according to a third preferred embodiment of the present invention.

Moreover, the present invention further provides a third preferred embodiment. FIG. 7 illustrates a structural side view of a backlight module of an input device with luminous patterns according to a third preferred embodiment of the present invention. Referring to FIG. 7, the input device 5 with luminous patterns comprises an input interface 51, a backlight module 52, a protective layer 53 and a black printing ink layer 54, and a sequence from top to bottom thereof is the protective layer 53, the backlight module 52, the black printing ink layer 54 and the input interface 51. In the present preferred embodiment, the input interface 51 is an opaque printed circuit board (PCB) capacitive touch sensor.

The protective layer 53 is disposed over the input interface 51 and the backlight module 52, and the protective layer 53 is formed by uniformly mixing transparent plastic particles with a plurality of light shading particles 55 in a specific proportion first and then processed with an injection molding process, so as to let the protective layer 53 have a predetermined light shading rate and a uniform light shading result. In the present preferred embodiment, the predetermined light shading rate of the protective layer 53 is ranged between 75% and 80%, and the protective layer 53 is a plastic plate.

In the FIG. 7, the backlight module 52 comprises a light source 521 and a light guide plate 522, wherein the light source 521 is capable of generating light beams and located at a side of the light guide plate 522, while the light guide plate 522 is capable of guiding the transmission of the light beams. In addition, the light guide plate 522 has at least a pattern 5221 disposed on an upper surface 5222 of the light guide plate 522, and the black printing ink layer 54 is disposed on an upper surface of the input interface 51. The black printing ink layer 54 is capable of absorbing the light beams and may be used as a black background when the backlight module 52 is turned off, and thus the patterns 5221 are unable to be shown. Herein, the black printing ink layer 54 is formed by processing an ink printing technology to uniformly print the black printing ink on the upper surface of the input interface 51.

The present preferred embodiment is substantially similar to the second preferred embodiment, except that the backlight module 52 of the present preferred embodiment is disposed between the input interface 51 and the protective layer 53, and the patterns 5221 of the present preferred embodiment is disposed on the upper surface 5222 of the light guide plate 522. Hence, the effects resulted from the present preferred embodiment and the second preferred embodiment are substantially the same, except that the light shading effects of the two embodiments are slightly different due to the sequences of the faint light in the ambient environment passing through the micro structures of light guide and the light shading particles are different after the faint light is incident into the input device with luminous patterns. Besides, the other portions of the present preferred embodiment are substantially the same as that of the second preferred embodiment, and thus the detail descriptions thereof are omitted herein.

In the third preferred embodiment of the present invention, the backlight module 52 is located under the input interface 51, and thus a disposing sequence of the touch sensor and the light guide plate from top to bottom may be properly adjusted according to the properties thereof. Besides, the protective layer 53 in the present preferred embodiment is a plastic plate. However, the protective layer in the other preferred embodiment may be glass plate as well.

According to the above mentioned preferred embodiments, it is understood that the input device with luminous patterns of the present invention is improved according to the combination manner of the input device with the light shading materials and the utilization efficiency of the backlight, i.e. the substrate or the protective layer of the input interface is formed by uniformly mixing the transparent plastic particles or the transparent glass particles with the plurality of light shading particles first and then processed with the injection molding process, so as to let the input interface has the predetermined light shading rate. Accordingly, the present invention may not only simplify the combination process of the backlight module with the light shading materials, reduce the probability of distributing the light shading materials unevenly during the fabrication process, and avoid the light shading materials fallen off due to a long term use or wear and tear during the light shading materials is transported. Herein, when the input interface or the protective layer uniformly mixed with the light shading materials to have a lower predetermined light shading rate is combined with the design of densely arranging the micro structures of light guide on light guide plate for forming the patterns, not only the utilization efficiency of the backlight is significantly increased, but also the requirement of not to show the patterns when the backlight turned off is achieved. In addition, it is studied and thus found out that the most proper light shading rate of the input device with the luminous patterns fabricated by such a manner is about 75% to 80%. Therefore, it is able to not only achieve the requirement of not to show the patterns when the backlight is turned off, but also enhance the utilization efficiency of the backlight of the input device with the luminous patterns of the present invention to 20% to 25%, which is ten times to the utilization efficiency of the backlight of the conventional input device. In a word, the input device with the luminous patterns of the present invention is improved according to the combination manner of the input device with the light shading materials and the utilization efficiency of the backlight, so as to have the advantages of enhancing utilization efficiency of the backlight, reducing cost, simplifying process, enhancing light shading uniformity and avoiding the light shading materials fallen off due to a long term use or wear and tear during transportation, and thus it is capable of enhancing overall value of industrial applications of the input device with the luminous patterns.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. An input device with luminous patterns, comprising:
    an input interface comprising at least one substrate doped with a plurality of light shading particles to create a predetermined light opacity, and the predetermined light opacity is between 75% and 80%; and
    a backlight module, disposed under the input interface, wherein the backlight module comprises:
        a light source; and
        a light guide plate, having at least one pattern disposed on an upper surface or a lower surface of the light guide plate, wherein when the light source is turned off, the at least one pattern is obscured due to the predetermined light opacity of the input interface.

2. The input device with luminous patterns as claimed in claim 1, wherein the at least one pattern is formed by a plurality of micro structures selected from a plurality of mesh points or a plurality of micro structures.

3. The input device with luminous patterns as claimed in claim 1, further comprising a black base plate for absorbing a light beam, wherein the black base plate helps obscure the at least one pattern when the backlight module is turned off, and the at least one pattern is a button pattern, a keyboard pattern or a pattern of an interactive component.

4. The input device with luminous patterns as claimed in claim 1, wherein the at least one substrate is a glass plate or a plastic plate.

5. The input device with luminous patterns as claimed in claim 4, wherein the input interface is a light transmissive resistive touch sensor.

6. The input device with luminous patterns as claimed in claim 1, wherein the input interface further comprises a protective layer disposed over the at least one substrate, and the protective layer is doped with the plurality of light shading particles to create the predetermined light opacity, and the predetermined light opacity is between 75% and 80%.

7. The input device with luminous patterns as claimed in claim 6, wherein the protective layer is a glass plate or a plastic plate.

8. The input device with luminous patterns as claimed in claim 7, wherein the input interface is a light transmissive surface capacitive touch sensor, a light transmissive inner capacitive touch sensor or a light transmissive projected capacitive touch sensor.

9. An input device with luminous patterns, comprising:
    an input interface;
    a backlight module, comprising:
        a light source; and
        a light guide plate, having at least one pattern, and the at least one pattern disposed on an upper surface or a lower surface of the light guide plate; and
    a protective layer, disposed over the backlight module and doped with a plurality of light shading particles to create a predetermined light opacity, wherein the predetermined light opacity is between 75% and 80%, wherein when the light source is turned off, the at least one pattern is obscured due to the predetermined light opacity of the protective layer.

10. The input device with luminous patterns as claimed in claim 9, wherein the protective layer is a glass plate or a plastic plate.

11. The input device with luminous patterns as claimed in claim 9, wherein the input interface is disposed under the backlight module, and the input interface is an opaque printed circuit board capacitive touch sensor.

12. The input device with luminous patterns as claimed in claim 9, further comprising a black printing ink layer disposed on an upper surface of the input interface for absorbing a light beam, wherein the black printing ink layer helps obscure the at least one pattern when the backlight module is turned off, and the at least one pattern is a button pattern, a keyboard pattern or a pattern of an interactive component.

* * * * *